United States Patent
Klesczewski et al.

(10) Patent No.: US 6,444,720 B1
(45) Date of Patent: Sep. 3, 2002

(54) OPEN-CELL RIGID POLYURETHANE FOAMS

(75) Inventors: Bert Klesczewski, Düsseldorf; Jörg Hofmann, Krefeld; Pramod Gupta, Bedburg, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/959,253

(22) PCT Filed: Apr. 11, 2000

(86) PCT No.: PCT/EP00/03218

§ 371 (c)(1),
(2), (4) Date: Oct. 18, 2001

(87) PCT Pub. No.: WO00/64958

PCT Pub. Date: Nov. 2, 2000

(30) Foreign Application Priority Data

Apr. 24, 1999 (DE) .......................................... 199 18 726

(51) Int. Cl.$^7$ ............................................... C08G 18/48
(52) U.S. Cl. ........................ 521/174; 521/118; 521/128; 521/129; 521/130

(58) Field of Search ................................. 521/118, 128, 521/129, 130, 174

(56) References Cited

U.S. PATENT DOCUMENTS

| 5,344,852 A | * | 9/1994 | Brooks et al. ......... 252/182.24 |
| 5,374,705 A | | 12/1994 | Laycock et al. ............... 528/77 |
| 5,519,068 A | | 5/1996 | Okada et al. ................ 521/174 |
| 5,648,447 A | | 7/1997 | Seneker et al. ................ 528/63 |
| 5,856,372 A | | 1/1999 | Ho et al. ..................... 521/159 |
| 6,201,035 B1 | * | 3/2001 | Tuinman et al. ............. 521/112 |

FOREIGN PATENT DOCUMENTS

| EP | 0 369 487 | 5/1990 |
| EP | 0 504 448 | 9/1992 |
| GB | 1065590 | 4/1967 |

* cited by examiner

*Primary Examiner*—John M. Cooney, Jr.
(74) *Attorney, Agent, or Firm*—Joseph C. Gil; Lyndanne M. Whalen

(57) ABSTRACT

Open-cell rigid foams containing urethane and/or isocyanurate and/or urea groups are produced with a long-chain polyether polyol having low double bond content.

14 Claims, No Drawings

OPEN-CELL RIGID POLYURETHANE FOAMS

BACKGROUND OF THE INVENTION

The invention relates to open-cell rigid foams containing urethane and/or isocyanurate groups and/or urea groups which are prepared using a polyol component containing long-chain polyether polyols having a low double bond content.

Polyurethane rigid foams are generally prepared from polyols having on average at least three hydroxyl groups per molecule, at least difunctional isocyanates, catalysts, stabilisers, blowing agents and optionally conventional additives.

The polyol component used is generally polyether polyols or polyester polyols or mixtures thereof, on average at least three hydroxyl groups per molecule being present in the polyol mixture used and the hydroxyl value of the polyol mixture used being from 100 to 900.

Examples of blowing agents used include volatile organic compounds having boiling points below 60° C., or water. Water reacts with the isocyanate component with the formation of carbon dioxide and amine which in turn continues to react with the isocyanate component to polyurea.

The resulting rigid foams are mostly predominantly closed-cell foams with a density from 5 to 950 kg m$^{-3}$. In order to obtain open-cell rigid foams, polyols with a high content of oxyethylene groups and/or special silicone stabilisers and/or additives such as calcium stearate, solids or oleochemical derivatives are used.

Open-cell rigid foams are used, e.g., as a hydrophilic substrate for flower cultivation. Further applications for rigid foams with a high open cell content are insulating applications (the components are optionally evacuated for this purpose), applications as an energy-absorbing material, e.g. in bumpers, or motor vehicle interior applications, and for motor vehicle headlinings.

More recent developments in the field of rigid foams relate to the controlled preparation of largely open-cell, particularly fine-cell polyurethane- or polyisocyanurate-modified polyurethane rigid foams. These may be used as insulating materials, e.g., in vacuum panels.

FR-A 1457824 describes the preparation of open-cell rigid foams using a polyether polyol mixture containing a large proportion of a long-chain polyether polyol having an hydroxyl value from 50 to 200.

EP-A 622 388 describes the preparation of open-cell rigid foams using a long-chain polyether polyol having an hydroxyl value from 25 to 60, a maximum of 5% of oxyethylene groups and a maximum of 5% of primary terminal hydroxyl groups, in combination with water as the sole blowing agent, and a polyether polyol with an hydroxyl value from 150 to 800 which has a maximum of 5% of primary terminal hydroxyl groups and has a polyfunctional amine as the starter molecule.

SUMMARY OF THE INVENTION

It has now been found that rigid foams containing urethane and/or isocyanurate groups and/or urea groups and having a high open cell content may be prepared easily and in a controlled manner by using, in the polyol mixture employed, poly(oxyalkylene)polyols with an hydroxyl value from 3 to 90 which have a carbon-carbon double bond content of less than 15 mmole.kg1$^{-1}$.

DETAILED DESCRIPTION OF THE INVENTION

The invention provides predominantly open-cell rigid foams containing urethane and/or isocyanurate groups and/or urea groups which may be obtained by reacting a) di- or polyisocyanates with b) a polyol component with on average at least two groups which are reactive towards isocyanates, c) water and/or one or more physical blowing agents, d) optionally catalysts, e) optionally further auxiliaries and additives, characterised in that the component b) contains at least one poly(oxyalkylene)polyolwhich has an hydroxyl value from 3 to 90, preferably 3 to 60 and contains not more than 15 mmole.kg$^{-1}$, preferably not more than 12 mmole.kg$^{-1}$ of carbon-carbon double bonds.

Organic di- or polyisocyanates are used as component a) in the process according to the invention. Suitable di- or polyisocyanates include aliphatic, cycloaliphatic, araliphatic, aromatic and heterocyclic polyisocyanates of the kind described in Justus Liebigs Annalen der Chemie 562 (1949) 75, for example, those corresponding to the formula

$$Q(NCO)_n$$

wherein n means an integer from 2 to 4, preferably 2, and

Q means an aliphatic hydrocarbon radical having 2 to 18, preferably 6 to 10 carbon atoms, a cycloaliphatic hydrocarbon radical having 4 to 15, preferably 5 to 10 carbon atoms, an aromatic hydrocarbon radical having 6 to 15, preferably 6 to 13 carbon atoms, or an araliphatic hydrocarbon radical having 8 to 15, preferably 8 to 13 carbon atoms.

Polyisocyanates of the kind described in DE-OS 28 32 253 are preferred. As a rule, the polyisocyanates which are easy to obtain industrially are particularly preferred, e.g., 2,4- and 2,6-toluene diisocyanate and any mixtures of said isomers ("TDI"), polyphenylpolymethylene polyisocyanates of the kind prepared by aniline-formaldehyde condensation followed by phosgenation ("crude MDI") and polyisocyanates containing carbodiimide groups, urethane groups, allophanate groups, isocyanurate groups, urea groups or biuret groups ("modified polyisocyanates"), particularly those modified polyisocyanates derived from 2,4- and/or 2,6-toluene diisocyanate or from 4,4'- and/or 2,4'-diphenylmethane diisocyanate. It is also possible to use prepolymers of the aforementioned isocyanates and organic compounds having at least one hydroxyl group. Examples therefor of suitable hydroxyl compounds include polyols or polyesters having one to four hydroxyl groups and (number-average) molecular weights from 60 to 1,400. The polyisocyanates available industrially under the name "polymeric diphenylmethane diisocyanate" with a functionality greater than 2.0 and prepolymers prepared therefrom are very particularly preferred.

According to the invention, the polyol component b) contains at least one poly(oxyalkylene)polyol which has an hydroxyl value from 3 to 90, preferably 3 to 60 and not more than 15 mmole.kg$^{-1}$, preferably not more than 12 mmole.kg$^{-1}$ of carbon-carbon double bonds. It is also, however, possible to use mixtures of said polyols. The poly(oxyalkylene) polyols preferably have an average functionality from 2 to 8, particularly preferably from 2 to 6. The proportion of said polyols in component b) is preferably from 0.1 to 50 wt. %, particularly preferably 1 to 30 wt. %.

The poly(oxyalkylene)polyols used according to the invention may be prepared, e.g., by polyaddition of alkylene oxides to polyfunctional starter compounds in the presence of caesium, rubidium, strontium or barium hydroxide or alternative basic catalysts, or by rearrangement of allylic C—C double bonds to propenylic C—C double bonds in a polyol having a C—C double bond content of >15 mmole.kg$^{-1}$ prepared in the conventional way by catalysis by means of alkali hydroxides or alkoxides followed by hydrolysis with acid. The poly(oxyalkylene)polyols used according to the invention are preferably prepared using a highly active double metal cyanide catalyst from a starter compound having an average of 2 to 8, preferably 2 to 6 active hydrogen atoms and one or more alkylene oxides, as described, for example, in EP-A 761 708.

Preferred starter compounds are molecules having two to eight hydroxyl groups per molecule such as water, triethanolaamine, ethane 1,2-diol, propane 1,2-diol, propane 1,3-diol, diethylene glycol, dipropylene glycol, triethylene glycol, tripropylene glycol, butane 1,2-diol, butane 1,3-diol, butane 1,4-diol, hexane 1,2-diol, hexane 1,3-diol, hexane 1,4-diol, hexane 1,5-diol, hexane 1,6-diol, glycerol, trimethylolpropane, pentaerythritol, sorbitol and sucrose. Further preferred starter compounds include ammonia or compounds having at least one primary or secondary amino group, such as, for example, aliphatic amines such as 1,2-diaminoethane, oligomers of 1,2-diaminoethane (for example, diethylenetriamine, triethylenetetramine or pentaethylenehexamine), ethanolamine or diethanolamine, 1,3-diaminopropane, 1,3-diaminobutane, 1,4-diaminobutane, 1,2-diaminohexane, 1,3-diaminohexane, 1,4-diaminohexane, 1,5-diaminohexane, 1,6-diaminohexane, aromatic amines such as 1,2-diaminobenzene, 1,3-diaminobenzene, 1,4-diaminobenzene, 2,3-diaminotoluene, 2,4-diaminotoluene, 3,4-diaminotoluene, 2,5-diaminotoluene, 2,6-diaminotoluene, 2,2'-diaminodiphenylmethane, 2,4'-diaminodiphenylmethane, 4,4'-diaminodiphenylmethane or aromatic amines obtained by acid-catalysed condensation of aniline with formaldehyde. The starter compounds may be used on their own or in mixture.

Starter compounds particularly preferred for the reaction with a highly active double metal cyanide catalyst are those which may be obtained, e.g., by conventional alkali catalysis from the above-mentioned hydroxy-functional low molecular weight starter compounds and alkylene oxides such as oxirane, methyloxirane and/or ethyloxirane.

Preferred alkylene oxides for the preparation of the poly (oxyalkylene)polyols used according to the invention are oxirane, methyloxirane and ethyloxirane. These may be used on their own or in mixture. If used in mixture, the alkylene oxides may be reacted randomly or in blocks or in both ways successively. Further details can be obtained from "Ullmans Encyclopadie der industriellen Chemie", volume A21, 1992, p. 670 f.

The poly(oxyalkylene)polyol used according to the invention may also be a dispersion of a polymerisation product in a poly(oxyalkylene)polyol according to the invention. Said polymerisation product may be prepared, e.g., by free-radical in situ polymerisation of acrylonitrile and/or styrene in a poly(oxyalkylene)polyol, e.g., by the method according to U.S. Pat. No. 3,523,093. Examples of other polymerisation products include polyurea compounds, polyhydrazides or polyurethanes containing tertiary amino groups. Suitable methods for the preparation of dispersions of said polymerisation products are described, for example, in EP-A 11 752, U.S. Pat. No. 4,374,209 and DE-OS 32 31 497. The proportion of polymerisation products in the dispersion is preferably 1 to 50 wt. %.

Apart from the poly(oxyalkylene)polyols having an hydroxyl value from 3 to 90, preferably 3 to 60 and a C—C double bond content of not more than 15 mmole.kg$^{-1}$, preferably not more than 12 mmole.kg$^{-1}$, the polyol component b) contains at least one further compound having at least two hydrogen atoms which are reactive towards isocyanates. These are preferably one or more polyol(s). Preferred polyols are polyether and/or polyester polyols of the kind described, e.g., in G. Oertel (eds.): "Kunststoffhandbuch", vol. VII, C. Hanser Verlag, 3rd edition, Munich 1993, p. 57–75.

Polyether polyols are obtained by polyaddition of alkylene oxides such as, for example, oxirane, methyloxirane, ethyloxirane, decyloxirane or phenyloxirane, preferably methyloxirane, ethyloxirane or oxirane, to starter compounds having active hydrogen atoms. Examples of suitable starter compounds include ammonia or compounds which have at least one primary or secondary amino group, such as, for example, aliphatic amines such as 1,2-diaminoethane, oligomers of 1,2-diaminoethane (for example, diethylenetriamine, triethylenetetramine or pentaethylenehexamine), ethanolamine or diethanolamine, 1,3-diaminopropane, 1,3-diaminobutane, 1,4-diaminobutane, 1,2-diaminohexane, 1,3-diaminohexane, 1,4-diaminohexane, 1,5-diaminohexane, 1,6-diaminohexane, aromatic amines such as 1,2-diaminobenzene, 1,3-diaminobenzene, 1,4-diaminobenzene, 2,3-diaminotoluene, 2,4diaminotoluene, 3,4-diaminotoluene, 2,5-diaminotoluene, 2,6-diaminotoluene, 2,2'-diaminodiphenylmethane, 2,4'-diaminodiphenylmethane, 4,4'-diaminodiphenylmethane or aromatic amines which are obtained by acid-catalysed condensation of aniline with formaldehyde. Further suitable starter compounds are those having two or more terminal hydroxyl groups such as, for example, water, triethanolamine, ethane 1,2-diol, propane 1,2-diol, propane 1,3-diol, diethylene glycol, dipropylene glycol, triethylene glycol, tripropylene glycol, butane 1,2-diol, butane 1,3-diol, butane 1,4-diol, hexane 1,2-diol, hexane 1,3-diol, hexane 1,4-diol, hexane 1,5-diol, hexane 1,6-diol, glycerol, trimethylolpropane, pentaerythritol, sorbitol and sucrose. The starter compounds may be used on their own or as mixtures. Polyether polyols which may be used according to the invention in the polyol component b) have (number-average) molecular weights from 150 to 12,500 g/mole, preferably 200 to 1500 g/mole.

In polyol component b) it is also possible to use one or more polyester polyols having (number-average) molecular weights from 100 to 30,000 g/mole, preferably 150 to 10,000 g/mole, particularly preferably 200 to 6000 g/mole of aromatic and/or aliphatic dicarboxylic acids and polyols having at least two hydroxyl groups. Examples of dicarboxylic acids include phthalic acid, isophthalic acid, terephthalic acid, fumaric acid, maleic acid, azelaic acid, glutaric acid, adipic acid, suberic acid, sebacic acid, malonic acid and succinic acid. The pure dicarboxylic acids and any mixtures thereof may be used. Instead of free dicarboxylic acids it is also possible to use the corresponding dicarboxylic acid derivatives such as, e.g., dicarboxylic acid mono- or diesters of alcohols having one to four carbon atoms. Such esters are obtained, for example, when polyester wastes are recycled. The acid component used may also be dicarboxylic acid anhydrides such as phthalic anhydride or maleic anhydride. Examples of the preferred alcohol component for esterification include: ethylene glycol, diethylene glycol, tetraethylene glycol, propane 1,2-diol, propane 1,3-diol, butane 1,4-diol, pentane 1,5-diol, hexane 1,6-diol, decane 1,10-diol, glycerol, trimethylolpropane, pentaerythritol or mixtures thereof. Polyester polyols of lactones, e.g., ε-caprolactone or hydroxycarboxylic acids, e.g., ω-hydroxycarboxylic acids may also be used.

The polyol component b) may also contain polyether ester polyols of the kind obtained, e.g., by reaction of phthalic anhydride with diethylene glycol followed by reaction with oxirane.

Further examples of suitable polyols which may be contained in the polyol component b) include polyfunctional alcohols or amines or aminoalcohols or mixtures thereof and the oxypropylated and/or oxyethylated secondary products thereof, or polyester polyols which are obtained by esterification of polyfunctional alcohols with polyfunctional carboxylic acids.

The preferred component c)-used in the process according to the invention is water as a chemical blowing agent which yields carbon dioxide as the blowing gas by reaction with isocyanate groups. Water is used preferably in an amount from 0.001 to 10 wt. %, based on the amount of component b). It is also possible to use non-combustible physical blowing agents in component c) such as, e.g., dichloromethane, dichloromonofluoromethane, difluoromethane, trifluoromethane, difluoroethane, 1,1,1,2-tetrafluoroethane, tetrafluoroethane (R 134 or R 134a), 1,1,1,3,3,3-hexafluoropropane (R 356), 1,1,1,3,3-pentafluoropropane (R 245fa), chlorodifluoroethane, 1,1-dichloro-2,2,2-trifluoroethane, 2,2-dichloro-2-fluoroethane, heptafluoropropane and sulfur hexafluoride. Mixtures of said blowing agents may also be used. Further suitable blowing agents include carboxylic acids such as formic acid, acetic acid, oxalic acid and chemical blowing agents which liberate gases during the foaming process such as, e.g., azo compounds. Said blowing agents may be used in combination with water.

For the preparation of the rigid foams according to the invention, catalysts which accelerate the reaction between the isocyanate component a) and the polyol component b) may be used optionally as component d). Examples of suitable catalysts include organotin compounds such as tin(II) salts of organic carboxylic acids, e.g., tin(II) acetate, tin(II) octoate, tin(II) ethylhexoate and tin(II) laurate and the dialkyltin(IV) salts e.g. dibutyltin diacetate, dibutyltin dilaurate and dioctyltin diacetate. Further examples of suitable catalysts include amines such as triethylamine, dimethylcyclohexylamine, dimethylbenzylamine, pentarnethyldiethylene triamine, N,N,N',N'-tetramethylbutane diamine, N-methylmorpholine, bis(dimethylaminoethyl) ether and tris(dialkylaminoalkyl)-s-hexahydrotriazines. The catalyst component d) preferably contains at least one aliphatic amine. The catalyst component d) contains particularly preferably N-(dimethylaminoethyl)-N-methylethanolamine which is available commercially under the trade name Dabco® T (Air Products). A combination of several catalysts may also be used.

The components b), c) and d) are usually mixed before the foaming process. This mixture preferably has an average functionality of from 3.0 to 6.0 and an average OH value of from 120 to 700.

Optionally, further auxiliaries and additives e) may also be added during the preparation of the rigid foams according to the invention. Examples include flame retardants such as, for example, tricresyl phosphate, tris-(2-chloroethyl) phosphate, tris-(2-chloropropyl)phosphate, tris-(2,3-dibromopropyl)phosphate, tetrakis-(2-chloroethyl)-ethylene diphosphate, dimethylmethane phosphonate, diethanolaminomethylphosphonic acid diethyl ester and halogen-containing polyols with a flame retardant effect. It is also possible to incorporate paraffins or fatty alcohols or dimethylpolysiloxanes and pigments or dyes, and also stabilisers to prevent the effects of ageing and weathering, plasticisers such as dioctyl phthalate and fungistatic and bacteriostatic substances and fillers such as barium sulfate, kieselguhr, carbon black or whiting. These are mostly added to the polyol component in amounts from 0 to 10 parts by weight, preferably 0 to 5 parts by weight. Further examples of optionally incorporated surfactant additives and foam stabilisers and cell regulators, reaction inhibitors, stabilisers, flame retardants, dyes and fillers and fungistatic and bacteriostatic substances and details about the use and mode of action of said additives are described in G. Oertel (eds.) "Kunststoff-Handbuch" vol. VII, Carl Hanser Verlag, 3rd edition, Munich 1993, p. 110–115.

The predominantly open-cell rigid foams according to the invention are usually prepared by intensively mixing the di- or polyisocyanate a) as one component and the other constituents in mixture as the other component using a suitable, usually mechanical device. The preparation of the rigid foams may take place both continuously, such as on a conveyor belt plant, or batchwise. The preparation of rigid foams is known in principle to the skilled person and described, for example, in G. Oertel (eds.) "Kunststoff-Handbuch" vol. VII, Carl Hanser Verlag, 3rd edition, Munich 1993, p. 271–286.

The preparation of the largely open-cell rigid foams containing urethane and/or isocyanurate groups and/or urea groups is preferably carried out in such a way that the NCO/OH index, i.e. the stoichiometric ratio between reactive isocyanate groups and hydroxyl groups is from 0.5 to 6.0. The NCO/OH index is particularly preferably 0.7 to 1.5. The density of the resulting moulded articles is preferably 5 kg m$^{-3}$ to 500 kg m$^{-3}$, particularly preferably 10 kg m$^3$ to 200 kg m$^{-3}$. The volume percentage of open cells of the moulded articles measured to DIN ISO 4590-86 is at least 20%; the moulded articles have minimal shrinkage, if any.

The invention also provides the use of the rigid foams according to the invention as an intermediate layer for composite elements, as filler substrates for vacuum insulation panels and for foam-filling cavities of cold stores and in container construction, as a hydrophilic substrate for flower cultivation and as an energy-absorbing material, e.g. in bumpers, or motor vehicle interior applications and for motor vehicle headlinings.

EXAMPLES

The following raw materials were used in the Examples:

Polyol A: Addition product of methyloxirane to sucrose/propylene glycol having an hydroxyl value of 380

Polyol B: Addition product of methyloxirane to sucrose/ethylene glycol having an hydroxyl value of 450

Polyol C: Addition product of methyloxirane to trimethylolpropane having an hydroxyl value of 870

Polyol D: Addition product of methyloxirane to ethylene diamine having an hydroxyl value of 625

Polyol E: Addition product of oxirane to a reaction product of diethylene glycol and phthalic anhydride having an hydroxyl value of 300

Polyol F: Addition product of methyloxirane to glycerol having an hydroxyl value of 56 and a C—C double bond content of 27 mmole kg$^{-1}$ Polyol G: Addition product of methyloxirane to glycerol having an hydroxyl value of 56 and a C—C double bond content of 7.2 mmole kg$^{-1}$ Isocyanate: Polymeric diphenylmethane diisocyanate having an isocyanate group content of 31.4 wt. %

Catalyst 1: Dimethylcyclohexylamine

Catalyst 2: N-(dimethylaminoethyl)-N-methylethanolamine (Dabco® T, Air Products GmbH, D-45527 Hattingen)

Stabiliser 1: Silicone stabiliser (Tegostab® B-8466, Th. Goldschmidt AG, D-45127, Essen)
Stabiliser 2: Silicone stabiliser (Tegostab® B-8469, Th. Goldschmidt AG, D-45127, Essen)

Specimens with a surface area of 5 cm×5 cm and a foam height of about 100 cm were prepared by the foaming process conventionally used on a laboratory scale. The following formulations were used:

| Example no. | 1 | A* | 2 | B* | 3 | C* |
|---|---|---|---|---|---|---|
| Constituents/parts by wt. | | | | | | |
| Polyol A | 45 | 45 | | | | |
| Polyol B | | | 40 | 40 | 40 | 40 |
| Polyol C | 15 | 15 | 30 | 30 | 30 | 30 |
| Polyol D | 15 | 15 | | | | |
| Polyol E | 10 | 10 | 10 | 10 | 10 | 10 |
| Polyol F | | 15 | | 20 | | 20 |
| Polyol G | 15 | | 20 | | 20 | |
| Catalyst 1 | | | | | 1.3 | 1.3 |
| Catalyst 2 | 1.2 | 1.2 | 1.7 | 1.7 | | |
| Stabiliser 1 | 2 | 2 | | | | |
| Stabiliser 2 | | | 2 | 2 | 2 | 2 |
| Water | 4 | 4 | 4 | 4 | 4 | 4 |
| Isocyanate | 157 | 157 | 177 | 177 | 177 | 177 |
| Characteristic (NCO/OH) | 110 | 110 | 110 | 110 | 110 | 110 |
| Stirring time/s | 6 | 6 | 6 | 6 | 6 | |
| Fibre time/s | 50 | 50 | 52 | 54 | 48 | 49 |
| Density/kg m$^{-3}$ | 51 | 49 | 54 | 51 | 55 | 51 |
| Average percentage of open cells/% | 78 | 50 | 96 | 77 | 47 | 34 |

*Comparison example

The volume percentage of open cells was determined to DIN ISO 4590-86.

The Examples according to the invention confirm that when the polyol mixtures according to the invention are used, the volume percentage of open cells of the resulting rigid foam is markedly increased.

What is claimed is:

1. An open-cell rigid foam containing a urethane, isocyanurate or urea group produced by reacting
   a) a diisocyanate or polyisocyanate with
   b) a polyoxyalkylene polyol having an average of at least two groups which are reactive with an isocyanate group, has a hydroxyl value of from 3 to 90 and contains no more than 15 mmole.kg$^{-1}$ of carbon-carbon double bonds,
   c) a blowing agent, and optionally,
   d) a catalyst, and/or
   e) auxiliaries and/or additives.

2. The foam of claim 1 in which water is used as the blowing agent.

3. The foam of claim 1 in which more than one physical blowing agent is used.

4. The foam of claim 1 in which a polyol other than one suitable for use as component b) is also included in the foam-forming mixture.

5. The foam of claim 1 having a density of from 5 to 500 kg/m$^{-3}$.

6. The foam of claim 1 in which polyol b) contains no more than 12 mmole.kg$^{-1}$ of carbon-carbon double bonds.

7. A process for the production of a predominantly open-cell rigid foam containing a urethane, isocyanurate or urea group comprising reacting
   a) a diisocyanate or polyisocyanate with
   b) a polyoxyalkylene polyol having an average of at least two groups which are reactive with an isocyanate group, has a hydroxyl value of from 3 to 90 and contains no more than 15 mmole.kg$^{-1}$ of carbon-carbon double bonds,
   c) a blowing agent, and optionally,
   d) a catalyst.

8. The process of claim 7 in which water is used as the blowing agent.

9. The process of claim 7 in which a mixture of physical blowing agents is used.

10. The process of claim 7 in which the catalyst used is N-(dimethyl-minoethyl)-N-methylethanolamine.

11. A vacuum panel made with the rigid foam of claim 1.

12. A refrigeration unit made with the rigid foam of claim 1.

13. A motor vehicle having an energy-absorbing component made with the rigid foam of claim 1.

14. A hydrophilic substrate for flower cultivation comprising the rigid foam.

* * * * *